(12) United States Patent
Pokrovski et al.

(10) Patent No.: US 6,788,834 B2
(45) Date of Patent: Sep. 7, 2004

(54) OPTOACOUSTIC FREQUENCY FILTER

(76) Inventors: Alexei Andreevich Pokrovski, ul.Botanicheskaya, d.18, k.3, kv.15, 198504 St. Petersburg (RU); Boris Sergeevich Pavlov, ul.Botanicheskaya, d.18, k.4, kv.30, 198504 St. Petersburg (RU); Lev Vassilievich Prokhorov, Zanevskii pr., d.10, kv., 195112 St. Petersburg (RU)

( * ) Notice: Subject to any disclaimer, the term of this patent is extended or adjusted under 35 U.S.C. 154(b) by 164 days.

(21) Appl. No.: 10/253,184

(22) Filed: Sep. 24, 2002

(65) Prior Publication Data

US 2003/0012478 A1 Jan. 16, 2003

Related U.S. Application Data

(63) Continuation-in-part of application No. PCT/RU01/00103, filed on Feb. 28, 2001.

(30) Foreign Application Priority Data

Mar. 31, 2000 (RU) ........................................ 2000108779

(51) Int. Cl.[7] .............................................. G06F 1/295
(52) U.S. Cl. .............................................. 385/7; 385/7
(58) Field of Search .............................. 385/4, 7, 3, 12

(56) References Cited

U.S. PATENT DOCUMENTS 4,735,484 A * 4/1988 Fesler .......................... 385/4
5,029,978 A * 7/1991 Curtis et al. .................... 385/3
5,101,449 A * 3/1992 Takeuchi et al. ................ 385/3
5,493,623 A * 2/1996 Frische et al. ................. 385/12
5,611,004 A   3/1997 Chang
5,652,808 A   7/1997 Duchet
5,652,809 A   7/1997 Aronson
6,021,237 A   2/2000 Kim
6,052,497 A   4/2000 Graebner

FOREIGN PATENT DOCUMENTS

RU          2176411        11/2001
WO       WO 96/27121       2/1996
WO       WO 01/73503       10/2001

* cited by examiner

Primary Examiner—Jared J. Fureman
Assistant Examiner—Daniel A. Hess
(74) Attorney, Agent, or Firm—Boris Leschinsky

(57) ABSTRACT

In a tunable optoacoustic filter, a portion of the optical fiber is coiled around and placed at least partially against a rounded shell equipped with at least one longitudinal slit having an emitter and an absorber on both sides of the slit in contact with the shell or the optical fiber. The emitter transmits elastic waves along the shell and therefore along the fiber to the point of absorber. Coiled configuration of the optical fiber along with various positions of emitters and absorbers are presented allowing to widen the functional range of operation of the filter by increasing the usable length of the optical fiber subject to acoustic oscillations. As a result a reflection/conversion coefficient of up to 0.999 and the filtration band of 1–10 kHz are obtainable.

33 Claims, 5 Drawing Sheets

100    400    300    200

OPTOACOUSTIC FREQUENCY FILTER

CROSS-REFERENCE DATA

This application is a continuation-in-part of a copending PCT application No. PCT/RU01/00103 with US as a designated state filed Feb. 28, 2001 and published Oct. 4, 2001, which in turn claims the priority benefit from the Russian Federation patent application No. RU 2000108779/28 filed Mar. 31, 2000, now Russian Patent No. RU 2176411. This application also claims the benefit of a Disclosure Document No. 492,198 filed with the U.S. Patent and Trademark Office on Apr. 16, 2001.

FIELD OF THE INVENTION

The present invention relates to the field of fiberoptics and more specifically to the tunable filters for optical fibers and can be used for construction of wavelength-selective optical devices, based in particular on optoacoustic effect, with tunable spectral range of reflected (transmitted) electromagnetic waves.

The invention can be used for construction of an external resonator for semiconductor injection lasers and for multiplexing/demultiplexing in the WDM communication systems.

BACKGROUND OF THE INVENTION

Different types of optoacoustic fiber-based devices are known, where wavelength-selective light conversion (such as the intensity reduction, phase modulation, frequency shift and mutual conversion of orthogonally polarized propagating waves) is accomplished by means of interference of said waves at the optical fiber inhomogeneities, which are induced by elastic deformation waves propagating along the optical fiber. Based on this optoacoustic effect, these deformations change the refractive index of the optical fiber, thus creating periodic structure traveling along the optical fiber. Interference of the waves of electromagnetic field guided within the optical fiber at this periodic inhomogeneities strongly depends on the correlation between the wavelength of the electromagnetic field wave and the wavelength of the elastic wave [see for example Yu. V. Gulyaev, M. Ya. Mesh, V. V. Proklov. Modulation effects in optical fiber waveguides and their applications. Moscow, Radio i Svyaz, 1991, in Russian]. In the known devices the elastic waves traveling in the optical fiber are induced (usually by means of piezoelectric transducer) in a straight-line piece of optical fiber between emitter and absorber of the elastic waves; both the emitter and the absorber are usually rigidly attached to the optical fiber.

The main disadvantage of all known optoacoustic optical fiber devices is the small length of optoacoustic interaction (less than 10–20 cm), the length being defined by attenuation of elastic waves. This length of interaction determines the coupling of unidirectional optoacoustically connected guided electromagnetic waves. The relatively short length of optoacoustic interaction results in wide spectral band of interaction of guided electromagnetic waves. Narrowing of the interaction spectral bandwidth by means of shortening of the elastic deformation wavelength (from 100–200 $\mu$m to 0.5 $\mu$m) does not seem to be very promising both technically (due to difficulties of exciting of 1 GHz frequency oscillations in optical fiber and stabilization of the frequency with 1 kHz precision) and physically (since elastic waves attenuation strongly increases as the frequency grows up).

A prior art device most similar to the device of the present invention is the all-optical fiber optoacoustical notch filter by Kim et al [U.S. Pat. No. 6,021,237 and H. S. Kim, S. H. Yun, I. K. Kuang et.al. All-fiber optoacoustic tunable notch filter with electronically controllable spectral profile. Opt. Lett., V.22, No.19, pp.1476–1478, 1997]. This filter consists of a straight-line piece of a single-mode optic optical fiber 15.5 cm long with flexural oscillations propagating along its axis. These oscillations are excited on one end of the piece by the cone-shaped emitter, surrounding the optical fiber. The flexural oscillations are absorbed on the other end of the piece in a special absorber. Frequency-selective transition of the IR light wave propagating along the optical fiber takes place due to electromagnetic wave interference on the periodic inhomogeneities of the refractive index. These inhomogeneities are caused by the propagating elastic wave via the optoacoustic effect. A symmetric single-cladding optical fiber with the 8.5 $\mu$m diameter of the core is used in this device; the frequency of the elastic oscillation was varied from 1.8 MHz to 2.8 MHz; the center of the arising filtration band varied in the range from 1450 nm to 1650 nm. The wavelength of the elastic wave was about 650 $\mu$m at the frequency of 2.33 MHz. The maximal damping of the propagating electromagnetic wave was −34 dB with 2 nm bandwidth.

The disadvantage of this device is its limited functional abilities caused by the short length of the interval of uniform elastic oscillations between the emitter and the absorber of the elastic waves (only about 15.5 cm). This limits the functional abilities to operation to the transmission mode only. Another shortcoming is the wide spectral range of filtration of about 1–2 nm.

The need exists therefore to increase the length of the optical fiber, which is subject to elastic oscillations between the emitter and the absorber thus enlarging the range of functional capabilities of the filter.

SUMMARY OF THE INVENTION

The principal object of the present invention is to provide a tunable optoacoustic filter with wide optoacoustic frequency-selective abilities by means of increasing the length of optoacoustic interaction in the interval of uniformity of the elastic oscillations. This elongation results in narrowing of the frequency bandwidth without the need to provide higher acoustic input power and in realization of new control regimes of the electromagnetic waves propagating along the optical fiber. In particular, one of the said regimes includes backward reflection of some part of the guided electromagnetic wave.

The object of the present invention is essentially achieved by coiling the optical fiber of the filter in a variety of ways. The principle of coiling allows to increase the usable length of the fiber to reach wider range of use. In its basic configuration, an optoacoustic frequency-selective tunable filter comprises at least one optical fiber, at least one emitter and at least one absorber of elastic deformation waves rigidly attached thereto via a cylindrical shell. The shell is made with at least one slit parallel to the shell's axis, such that the optical fiber is placed next to and rigidly attached to the surface of the shell in a manner providing for easy transmission of elastic waves from the shell into the optical fiber and back. In this configuration, the fiber forms a spiral coil winding around the shell, whereas the emitter and the absorber of elastic waves are placed onto and attached to the opposite sides of the slit.

The cylindrical shell of the invention is preferably made thin and its radius is chosen to be large in comparison with the wavelength of the elastic wave excited by the emitter.

The emitter of the elastic waves is made preferably from a piezoelectric material.

The absorber of elastic deformation waves is placed alongside the corresponding side of the slit so that it surrounds the fiber in the region where the optical fiber crosses the corresponding side of the slit.

It is also preferred to choose the material of the cylindrical shell and attach the fiber thereto such as to minimize the reflection and attenuation of the elastic wave energy on the interface between the optical fiber and the shell in the working range of frequencies of elastic oscillations of the filter.

A further objective of the present invention is to provide for total internal reflection on the interface of fiber cladding and the shell material, which preserves the major part of elastic deformation waves within the fiber and prevents dissipation of elastic motion energy outside the fiber. The shell material is preferably chosen in such a way as to ensure that the velocity of elastic waves (longitudinal and/or transversal) within the shell is higher than the velocity of the elastic waves (longitudinal and/or transversal, respectively) within the optical fiber cladding.

The technical result of the invention is the excitation of highly uniform running elastic wave in the entire section of the optical fiber wound around and attached to the cylindrical shell. This is in turn the result of uniformity of the elastic field in the shell outside the small region of the slit. The presence of at least one slit with the elastic wave absorber neutralizes the shell's resonance features and minimizes backward reflection of the elastic waves from the corresponding side of the slit.

This design provides the best approximation of the elastic wave field in each revolution of the spirally wound optical fiber to the field propagating in a straight-line piece of the optical fiber as known and used in other optoacoustic devices.

An important advantage of the filter of the present invention is that the number of the optical fiber spiral revolutions around the shell is not limited. Therefore, the filter of the invention can provide excitation of almost uniform elastic running wave in a section of optical fiber of any desired length.

In the disclosed optoacoustic filter device, the piezoelectric transducer excites elastic oscillations of the optical fiber, which is wound in a coil around the cylindrical shell. The slit or slits in the shell are at least partially filled with the material strongly absorbing elastic waves (such as for example penopolyurethane or poured resin), which reduces the resonance character of excitation of the tangentially propagating oscillation waves of the shell. The emitter creates oscillation waves of elastic deformation directed longitudinally, transversely or at an angle along the shell and the optical fiber attached to the shell. The elastic deformation waves propagate along optical fiber in the plane normal to the axis of the shell in a highly regular and uniform fashion in a piece of optical fiber of any desired length.

This uniformity provides operation of the filter in the reflection mode, whereas the backward reflected waves are at least partly guided inside the optical fiber. This uniformity also reduces the spectral width of the filtered radiation in transition mode. The spectral band of filtration is tunable by adjustment of frequency and intensity of elastic oscillations in the optical fiber, in the same way as proposed in the similar devices of the prior art. Reflection and energy dissipation of the elastic wave on the interface between the optical fiber and the shell could be minimized by the choice of materials of the cylindrical shell 2 and the optical fiber 1, for example, using fused quartz as a material of the shell.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limited to the figures of the accompanying drawings in which like references denote like or corresponding parts, and in which.

DETAILED DESCRIPTION OF THE FIRST PREFFERED EMBODIMENT OF THE INVENTION

Figure 1:
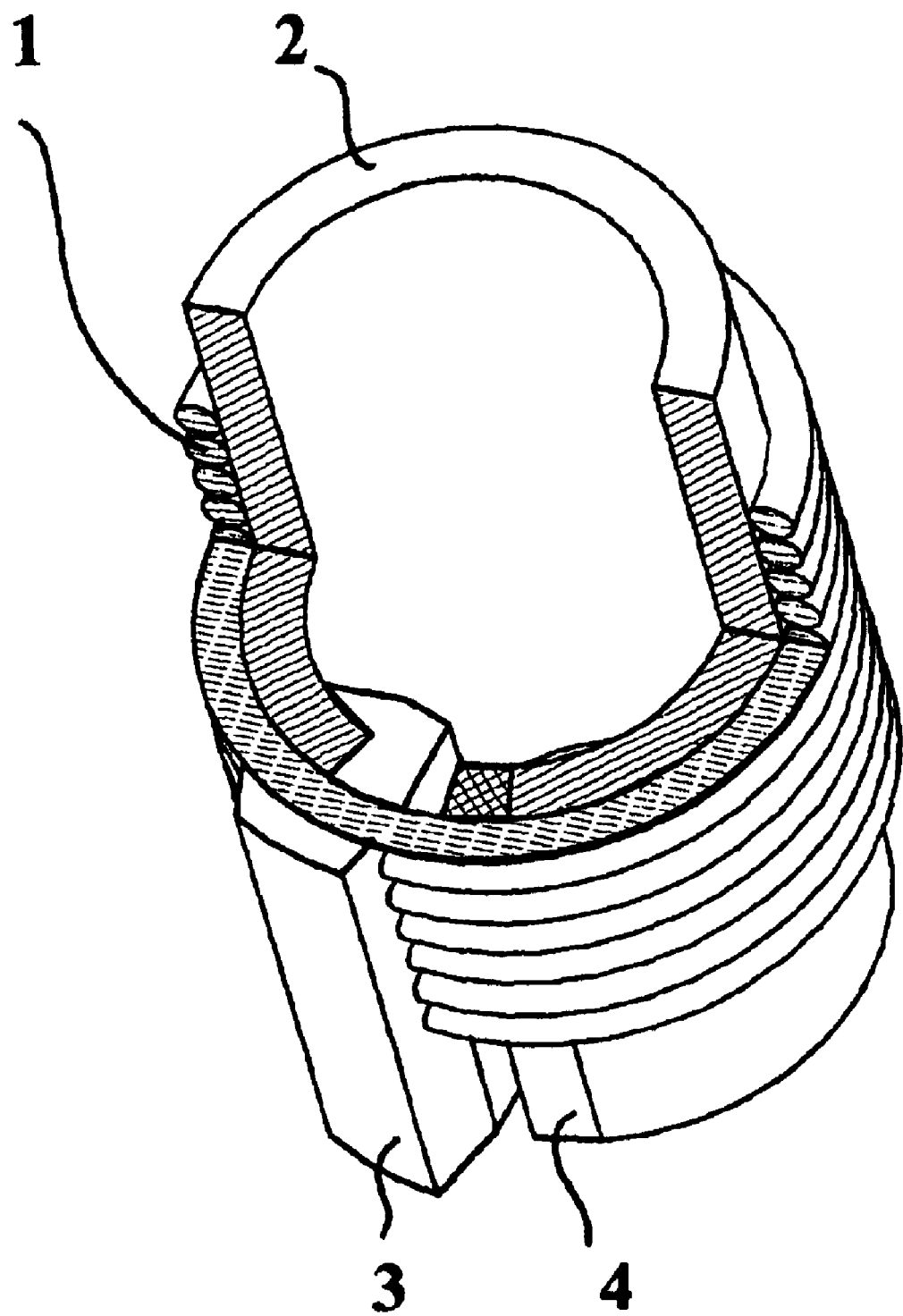
FIG. 1 is a general cut-out view of the first embodiment of the invention.
Figure 2:
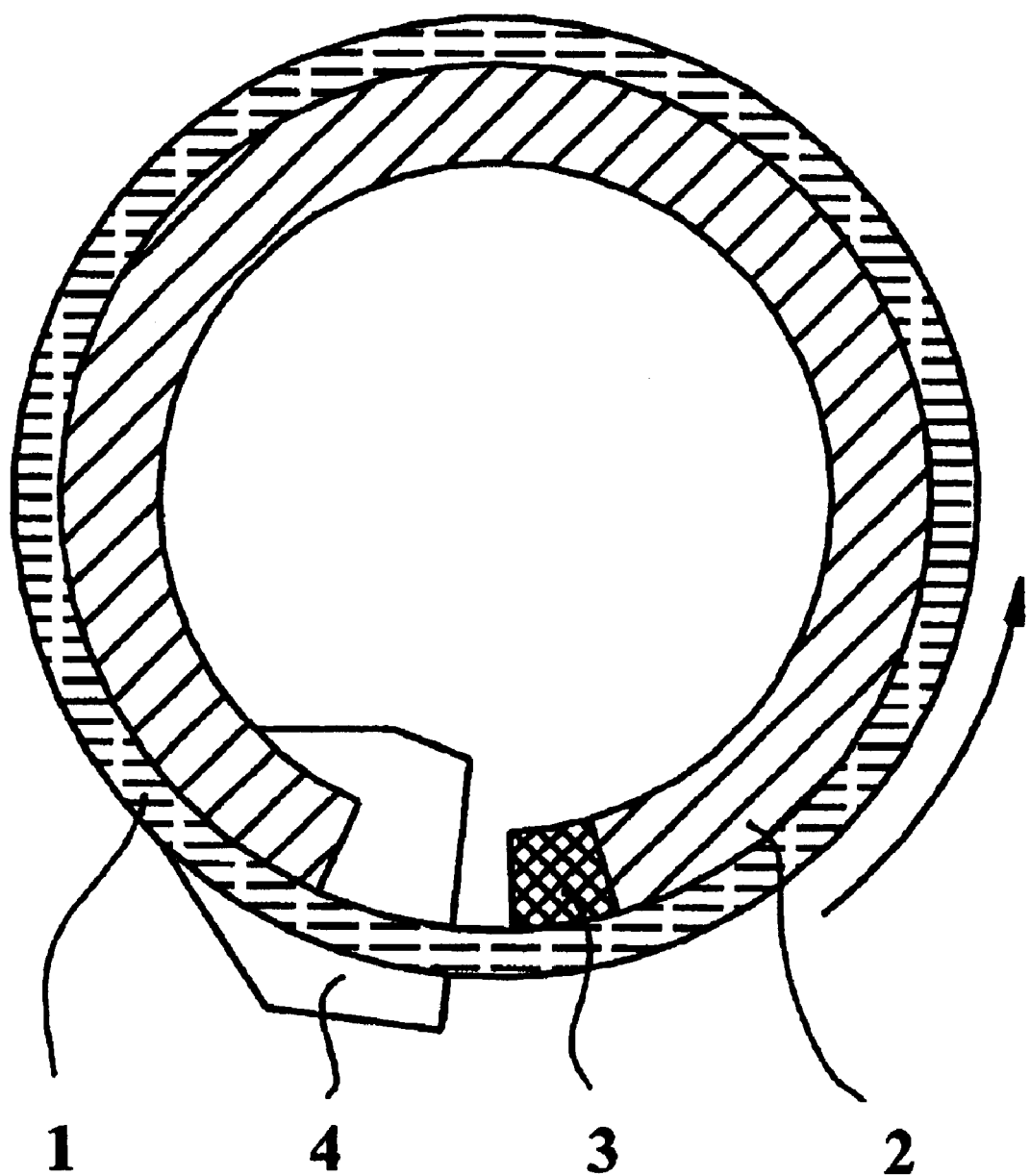
FIG. 2 is a schematic cross-sectional view of the same first embodiment of the invention.

Referring now to FIGS. 1 and 2, the disclosed first and most preferred embodiment of the device comprises a coiled optical fiber 1 wound about an outside wall of shell 2 and attached thereto. Each coil has a proximal end and a distal end. Also provided is an emitter of elastic waves 3 such as for example a piezoelectric transducer as well as an absorber of elastic waves 4. The emitter 3 and the absorber 4 are attached along the opposite sides of a transparent slit 5 along the long axis of the shell 2. The emitter 3 is attached to the proximal ends of the coiled optical fiber 1 and the absorber 4 is attached to the distal ends of the same fiber 1. Therefore, the distal and the proximal ends of the coils are located on the opposite sides of the slit along the shell 2. The cylindrical shell is made thin and its radius is chosen to far exceed the wavelength of the elastic wave excited by the emitter 3.

Both the emitter 3 and the absorber 4 can optionally entirely surround the optical fiber 1 and the sides of the slit 5 in the regions where sides of the slit 5 cross optical fiber 1, respectively.

In the preferred embodiment of the device the emitter 3 is placed on one side of the slit 5 whereas the absorber 4 is placed on the other side of the slit 5 and surrounds the optical fiber 1 as presented on FIGS. 1 and 2.

In operation of the device, an electrical alternating sinusoidal wave voltage E with adjustable amplitude and frequency is applied to the contacts of the emitter 3 (not shown). This causes the emitter to excite tangentially propagating elastic deformations or oscillations of the cylindrical shell 2, wherein these oscillations propagate along the shell in the plane orthogonal to the axis of the shell.

Elastic waves propagate from the emitter 3 to the absorber 4. This arrangement suppresses resonance effects and backward reflection of the elastic wave from the side of the slit 5 where the absorber 4 is placed. The cylindrical shell has a preferred radius from about 3 mm to about 10 cm which is far exceeding a typical elastic wavelength of 600 microns. Therefore the condition of having the ratio of the radius of curvature of the shell to the wavelength to be higher than 20 is satisfied. In addition, the radius has to be chosen to be by far shorter than the attenuation wavelength, which is typically below 100 cm. As a result of these two requirements being satisfied, the field of elastic wave propagation is almost completely uniform over the entire area of the cylindrical shell 2 and, consequently, along the axis of the portion of the optical fiber 1 which is wound around the shell 1.

The filter of the present invention provides also for the uniformity of the periodic modulation of the refractive index along the axis of the optical fiber 1. Interference of the electromagnetic waves guided in the optical fiber 1 on the arising interval with periodically modulated refractive index provides frequency-selective backward reflection of these waves.

Optionally, such interference can provide for conversion of the electromagnetic waves guided in the optical fiber 1 and propagating unidirectionally. The device of the present invention can also perform frequency-selective and adjustable conversion of unidirectionally propagating oscillations of electromagnetic waves guided in optical fiber 1, for example for coupling of core and cladding oscillations, or for coupling of oscillations with orthogonal polarization.

Scattering along a longer but yet uniform periodic structure of the device provides for an increased high reflection coefficient R of about 0.3. The small value of the relative perturbation of the refractive index $\delta$ of less or equal to about $10^{-5}$ provides for narrow band of reflection (filtering) within about 1 to 10 kHz and simultaneously solves the problem of overheating of the device in the area of the emitter 3 made as a piezoelectric transducer.

The disclosed device can be used with a particular advantage for creating of an external resonator in a semiconductor laser. The central wavelength of the filtering must be tunable in the entire range of radiation bandwidth of the laser's active element. Therefore the emission line of the arising laser will be tunable in the same spectral interval whereas the emission line width is defined by the bandwidth of reflection of the filter. Therefore the width of the emission line is also tunable through electronic control of parameters of the excited elastic oscillations.

It is known to use a so called Bragg grating with a rather small feedback coefficient of about $10^{-4}$ as an external resonator for the laser resulting in the emission line width as small as 1–10 kHz, see for example M. S. Klimov, A. S. Svakhin, V. A. Sychugov. Technology and some applications of corrugated structures in integrated optics. In: *Waveguide corrugated structures in integrated and fiber optics*. (Proc. IOFAN V.34) Moscow, Nauka, 1991 (in Russian). Using the proposed device we can easily obtain the same length of optoacoustic interaction.

The disclosed device can be also used for increasing the interaction length in all known optoacoustic tunable fiber devices.

Detailed Description of Additional Preferred Embodiments of the Invention

There are proposed a number of useful variations of the design of the tunable filter of the present invention as outlined below:

In a second embodiment of the invention, only a part of the optical fiber may be placed in direct contact on the surface of the cylindrical shell (not shown on the drawings).

In a third embodiment of the invention (not shown on the drawings), the emitter of the elastic waves is placed alongside the corresponding side of the slit of the shell. In a further alternative design, the emitter of elastic waves is placed in the range of crossing of the slit with the optical fiber, wherein the emitter may directly surround the optical fiber.

In a fourth embodiment of the invention (not shown on the drawings), the shell has a curved but not exactly circular shape, such as an oval of other deformed rounded cross-sectional shape. In this case however, the curvature radius should be chosen not less than 1 cm.

In a fifth embodiment of the invention (not shown on the drawings), the device comprises two or more sections of optical fiber coiled around the round shell in interleaving manner, thus producing identical optoacoustic deformation patterns in two or more optical fibers simultaneously.

In a sixth embodiment of the invention (not shown on the drawings), the device comprises more than one emitters and sources of elastic wave, working on the same driving frequency in phase coordination such as that they produce elastic wave running in one direction in the plane of the shell's cross-section.

Figure 3:
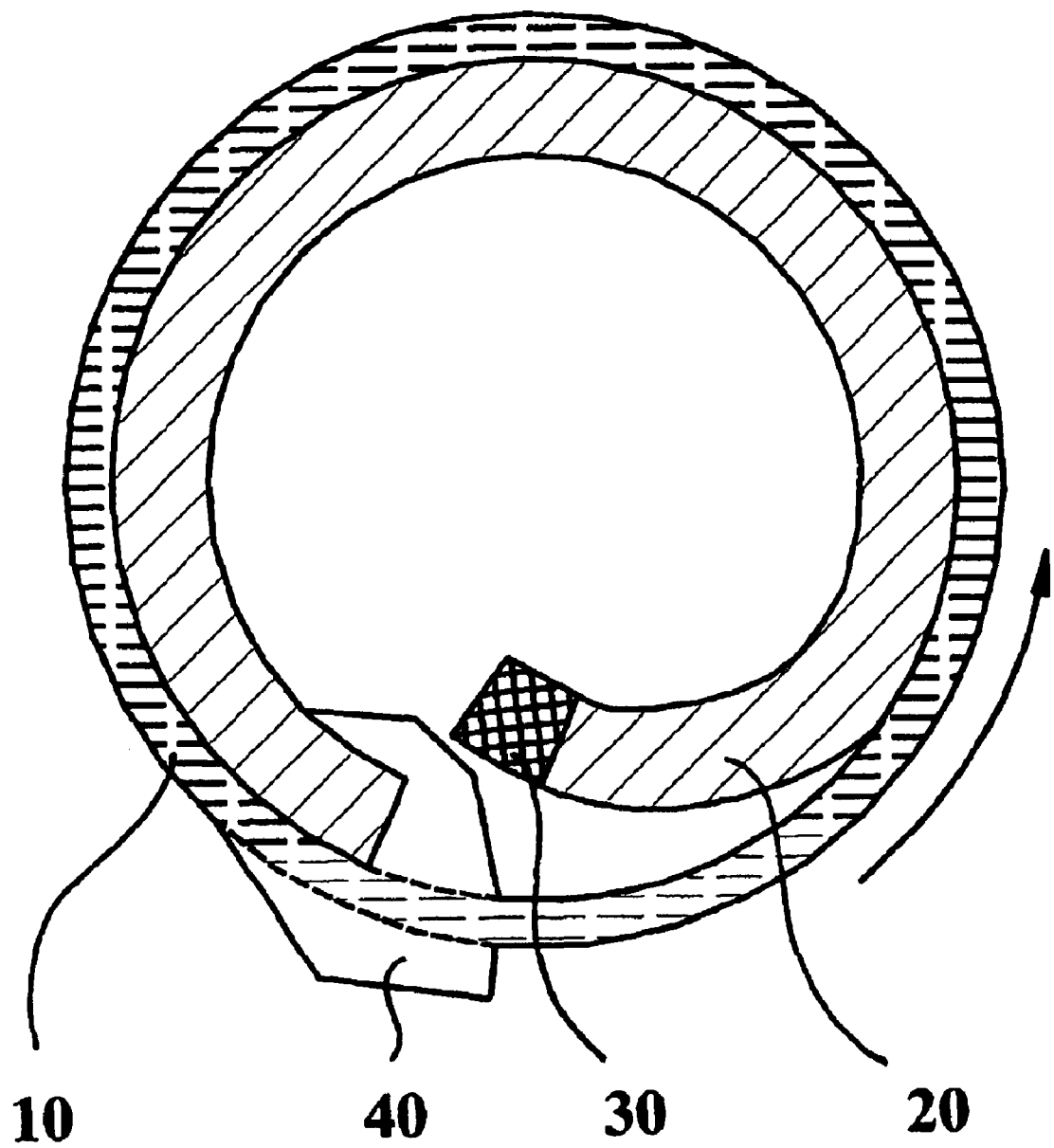
FIG. 3 is a cross-sectional view of an alternative embodiment of the invention.

In a seventh embodiment of the invention (shown on FIG. 3), the shell 20 has a cross-sectional shape as a part of helix, within one end growing under the other one. This design is especially useful for forming of finger transducer on the part of the shell 20 that is not in direct contact with fiber 10. Emitter 30 is placed in direct contact with the shell 20 but not with the fiber 10, which is still wound up as a coil. Absorber 40 is made the same as in the first embodiment of the invention.

In an eighth embodiment of the invention (not shown on the drawings), the shell of the device is equipped with one or more slits that are not exactly parallel to the shell's axis, with emitter and absorber on the opposite side of each slit.

In a ninth embodiment of the invention (not shown on the drawings), the shell is formed out of the cladding of the coiled optical fiber, wherein the claddings are welded, thermoformed, molded or glued together, forming the shell.

In a tenth embodiment of the invention (not shown on the drawings), the shell is equipped with more than one slit. An emitter is placed on one side of each slit, each emitter being driven with its own frequency and amplitude, producing in one portion of optical fiber a set of consecutive optoacoustically induced optical fiber Bragg grating, optionally with different periods and different phases.

In a further alternative variation of this embodiment, multiple emitters may be placed per one slit instead of one emitter, each exciting elastic waves in one coil or several adjacent coils, thus forming a line of emitters on the side of each slit. Each emitter may be driven with its own frequency, amplitude and phase, thus forming a set of several optoacoustic Bragg gratings (possibly long-period) within the same piece of optical fiber or, under special matching of driving phases, amplitudes and frequencies, single ultra-long optoacoustic fiber Bragg grating. In particular, this design may be especially useful in combination with the seventeenth embodiment for long-period optoacoustic gratings.

In an eleventh embodiment of the invention (not shown on the drawings), the optical fiber is chosen to be polarization dependent. Further, the optical fiber is made as a single-mode fiber (symmetric, polarization preserving, PANDA type, birefringent, or other). Further yet, the optical fiber is at least partially made out of a material with high optoacoustic quality, preferably out of lithium niobate ($LiNbO_3$) or paratellurite ($TeO_2$).

In a twelfth embodiment of the invention (not shown on the drawings), the optical fiber is made out of a birefringent material providing the possibility of two orthogonally polarized waves to propagate in the fiber and to be converted into one another by means of acoustic-optical perturbation introduced by the device.

In a thirteenth embodiment of the invention (not shown on the drawings), the cross-section of the shell varies in shape and size along its longitudinal axis, however, with the curvature radius being not less than 1 cm.

In a fourteenth embodiment of the invention (not shown on the drawings), the optical fiber is wound around the shell with spacing between the coils. The fiber forms a helix on the surface of the shell, wherein the increment of the helix may vary along the axis of the shell thus producing small changes in the elastic deformation wavelength traveling along the fiber and providing an apodised optoacoustic Bragg grating.

In a fifteenth embodiment of the invention (not shown on the drawings), the portion of the optical fiber wound around the shell has a gain-medium core, for example silica doped with Er and/or Yt ions. This would constitute an active region of a optical fiber laser or amplifier, pumped externally with the light of appropriate wavelength (approximately 980 nm for Er doping) producing the inverse population of lasing active media in the optical fiber core. Acoustic waves form the periodic Bragg grating in the active region of the fiber laser while combined with pumping, thus providing a feedback for laser source or gain spectrum flattening for fiber optic amplifier.

In a sixteenth embodiment of the invention (not shown on the drawings), the portion of fiber is placed on and attached to the internal surface of the shell.

Figure 4:
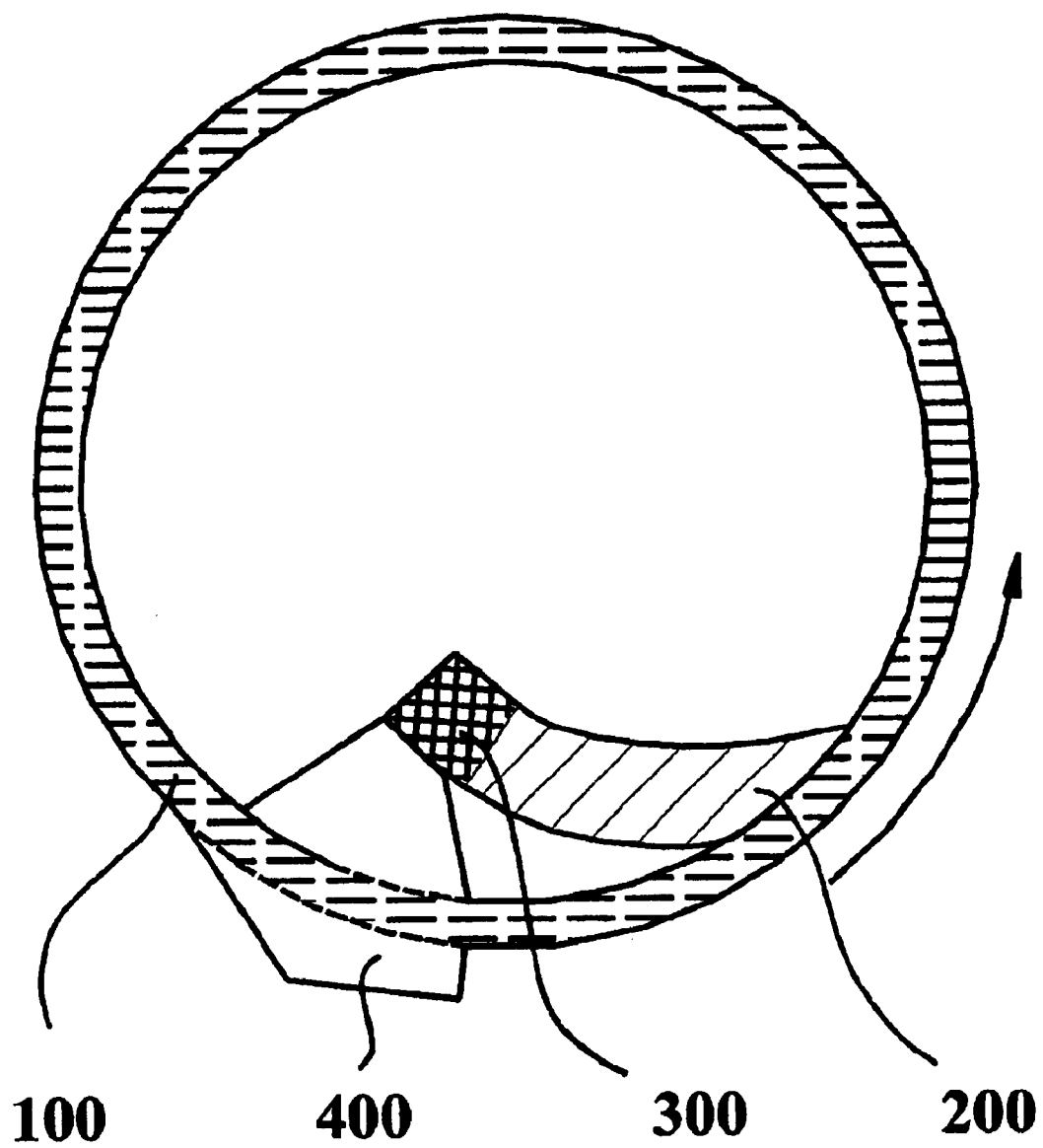
FIG. 4 is a cross-sectional view of yet another alternative embodiment of the invention.

In a seventeenth embodiment of the invention (shown on FIG. 4), the shell is almost entirely absent and the coils of the optical fiber 100 do not contact with each other mechanically. The coils of the fiber 100 are attached to the emitter 300 (or several emitters) and the absorber 400 (or several absorbers) only. There may be several emitters and absorbers during the 360° turn of the fiber coil 100, each coil being attached to various emitters/absorbers in different places. The transmission module 200 transmits elastic waves from emitter 300 to the optical fiber 100—this module can be considered as a reduced shell, since it covers at least partially the length of the coils along their common axis.

Figure 5:
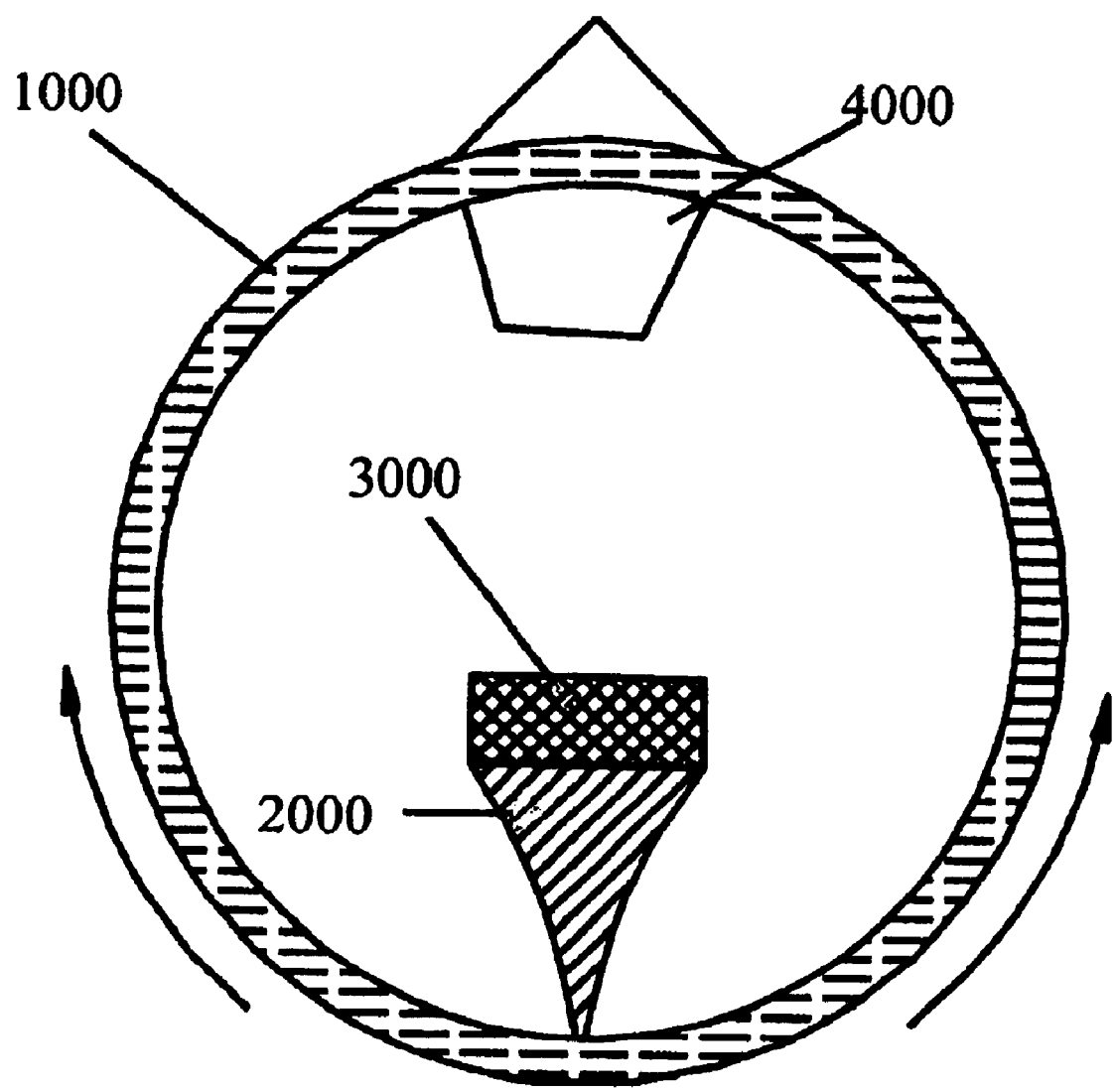
FIG. 5 is a cross-sectional view of yet a further alternative embodiment of the invention.

In an eighteenth and final embodiment of the invention shown on FIG. 5, the coils of the optical fiber 1000 do not contact with each other mechanically. The emitter contains a piezoelectric plate 3000 and a shell 2000 having a form of a prism parallel to the axis of the coils with its pointed end being in mechanical contact with the coils of the optical fiber 1000. The absorber 4000 is attached to the same coils half way on the other side of the emitter. This design produces elastic waves running along the optical fiber coils 1000 from the point of their contact with the intermediate prism 2000 to the absorber 4000, on one half of each coil clockwise and on the other half counter-clockwise. As a result of the optoacoustic interaction between the electromagnetic waves guided in the optical fiber and two elastic waves running in opposite directions along the length of the optical fiber, splitting of spectral profiles occurs. The order of the splitting is of the order of Doppler shift, which constitutes approximately $10^{-5}$. In spite of this splitting the device of the invention can be used for spectrometry purposes providing resolution of approximately 0.1 nm in the spectral interval of about 1–2 microns.

The present invention can be utilized in various useful applications in using one or more of the embodiments of the invention separately or in combination. Some examples of the most advantageous applications are described below:

General application as part of WDM multiplexor or demultiplexor

Application as part of WDM multiplexor or demultiplexor as a backup and/or standby and/or testing device, capable to be tuned to replace at least one WDM channel in case of necessity Application in sensor fiber system, in particular as a reference fiber Bragg grating. In this case, the central reflection wavelength is compared with the wavelength of guided light reflected from at least one FBG subject to changes of its central wavelength under the influence of external factors to be measured such as temperature, pressure, bending etc.

Application for frequency-selective wave conversion, between waves with orthogonal polarization in birefringent fibers, or between guided and cladding waves in single-mode fiber, or between other waves propagating in the same direction. Long-period optoacoustic fiber Bragg gratings are especially well designed for this purpose utilizing the present invention, since the relevant beat length defines comparatively low frequencies (1–100 MHz) with sufficiently low attenuation of energy of elastic waves. Ultra-long interaction length provided by this device results in higher spectral selectivity of wave conversion Application for providing frequency-selective feedback of Er-doped or other type fiber laser. Inherently all-fiber nature of the device completely eliminates the insertion loss in this application. In particular, the Bragg grating providing frequency-selective wavelength, may be formed optoacoustically within the active region of fiber laser, since formation of optoacoustic grating pattern in no way prevents frequently used light pumping of fiber lasers Application as a dispersion compensator Application as a gain-flattening absorption filter for Er-Doped fiber amplifiers Application as a selective element for optical fiber spectrometer. In this case, a single spectral component of light is guided by the core of the single-mode fiber and selectively coupled to a cladding wave, which is absorbed elsewhere. Thus the spectral component is selectively rejected and the spectral profile can be then detected by scanning the frequency of acoustic modulation. This in turn causes scanning of the wavelength of the rejected component of the guided wave over the whole spectral interval of the input light as well as registering of the overall intensity using a broadband photo-detector.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An optoacoustic frequency filter comprising:

at least one optical fiber, said fiber arranged to form at least one coil having at least one turn, said coil having a proximal end and a distal end, said distal end located in a vicinity of said proximal end, at least one emitter of elastic deformation waves attached to said proximal end of said coil, and at least one absorber of said elastic deformation waves attached to said distal end of said coil, wherein activation of said emitter causing an elastic deformation wave to initiate at said proximal end of said optical fiber and propagate along thereof in a path of said coil through to said absorber at the distal end of said coil.

2. The optoacoustic filter as in claim 1 further comprising a shell, said optical fiber coiled about said shell, said optical fiber being rigidly attached to said shell along at least a portion thereof, said shell having a slit, said proximal end and said distal end located on the opposite sides of said slit, wherein said elastic deformation waves propagate along said shell.

3. The optoacoustic filter as in claim 2, wherein said shell has a cylindrical shape.

4. The optoacoustic filter as in claim 3, wherein said shell has a radius chosen to be at least 20 times more than the wavelength of the elastic deformation wave.

5. The optoacoustic filter as in claim 4, wherein said shell has a radius of about 3 mm to 10 cm.

6. The optoacoustic filter as in claim 2, wherein said slit is parallel to the long axis of said shell.

7. The optoacoustic filter as in claim 2, wherein said shell having an inside and an outside wall, said optical fiber is wrapped around the outside wall.

8. The optoacoustic filter as in claim 2, wherein said optical fiber is wrapped along the inside wall of said shell.

9. The optoacoustic filter as in claim 2, wherein said shell has a radius of curvature of at least 1 cm.

10. The optoacoustic filter as in claim 2, wherein said emitter is located along the entire length of said slit.

11. The optoacoustic filter as in claim 2, wherein said emitter is entirely placed around said proximal end of said coil, said emitter also placed alongside and through said slit.

12. The optoacoustic filter as in claim 2, wherein said absorber is located along the entire length of said slit.

13. The optoacoustic filter as in claim 2, wherein said absorber is entirely placed around said distal end of said optical fiber.

14. The optoacoustic filter as in claim 2, wherein said shell is made of a material with high wave propagation velocity, such as quartz.

15. The optoacoustic filter as in claim 2, wherein said shell having a plurality of parallel slits, said slits oriented not to be parallel to the long axis of said shell, each slit having an emitter and an absorber located on the opposite ends thereof.

16. The optoacoustic filter as in claim 15, wherein said emitters are driven at individual frequencies and with individual amplitudes.

17. The optoacoustic filter as in claim 16, wherein said emitters are driven to produce a set of consecutive optoacoustically induced optical fiber Bragg grating.

18. The optoacoustic filter as in claim 15, wherein a plurality of emitters are placed on each slit, each emitter driven at individual frequency.

19. The optoacoustic filter as in claim 2, wherein said optical fiber forming a coil with multiple turns, said optical fiber comprising a cladding, said shell is formed from said cladding by rigidly connecting thereof between the turns of said coil.

20. The optoacoustic filter as in claim 2, wherein said shell having a variable cross-sectional shape along its long axis, said shell has a minimum radius of curvature of about 1 cm.

21. The optoacoustic filter as in claim 2, wherein said optical fiber is placed about said shell having spacing between consecutive turns of said coil.

22. The optoacoustic filter as in claim 1, wherein said emitter is a piezoelectric transducer.

23. The optoacoustic filter as in claim 1, further comprising a secondary fiber, said secondary fiber having a proximal end and a distal end, said emitter located at the proximal end of said secondary fiber, said absorber located at said distal end of said secondary fiber, said secondary fiber coiled in an interleaving manner around the coil of said optical fiber, wherein said emitter causing identical optoacoustic deformations in both fibers.

24. The optoacoustic filter as in claim 1 further comprising additional phase coordinated emitters working on the same driving frequency and located along said optical fiber.

25. The optoacoustic filter as in claim 1, wherein said optical fiber is polarization dependent.

26. The optoacoustic filter as in claim 1, wherein said optical fiber is a single-mode fiber.

27. The optoacoustic filter as in claim 1, wherein said optical fiber is made at least partially from a material with high optoacoustic quality.

28. The optoacoustic filter as in claim 1, wherein said fiber is made of lithium niobate or paratellurite.

29. The optoacoustic filter as in claim 1, wherein said fiber is made of a birefringent material.

30. The optoacoustic filter as in claim 1, wherein said fiber has a gain-medium core.

31. An optoacoustic frequency filter comprising:

at least one optical fiber, said fiber arranged to form a coil with at least one turn, said coil having a proximal end and a distal end, said distal end located in a vicinity of said proximal end, a curved shell located at least partially along the perimeter of said coil, said shell having a first end and a second end, at least one emitter of elastic deformation waves attached to said first end of said shell, and at least one absorber of said elastic deformation waves attached to said distal end of said coil, wherein activation of said emitter causing an elastic deformation wave to initiate at said first end of said shell, propagate along thereof to said optical fiber in a path of said coil through to said absorber at the distal end of said coil.

32. The optoacoustic filter as in claim 31, wherein said second end of said shell located at said distal end of said optical fiber, said shell having a shape of a helix.

33. The optoacoustic filter as in claim 31, wherein said shell is formed as a prism parallel to the long axis of the coil, said emitter located at said first flat end of said prism, said prism having its second pointed end in mechanical contact with the proximal end of said fiber, said absorber located half way between said proximal end and said distal end of said fiber.

* * * * *